C. L. WALTON.
TIRE MOLD.
APPLICATION FILED APR. 16, 1921.
1,380,085.
Patented May 31, 1921.
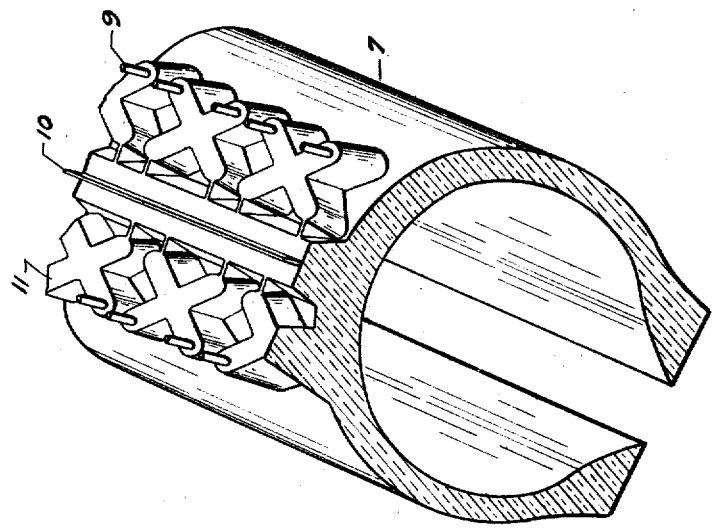
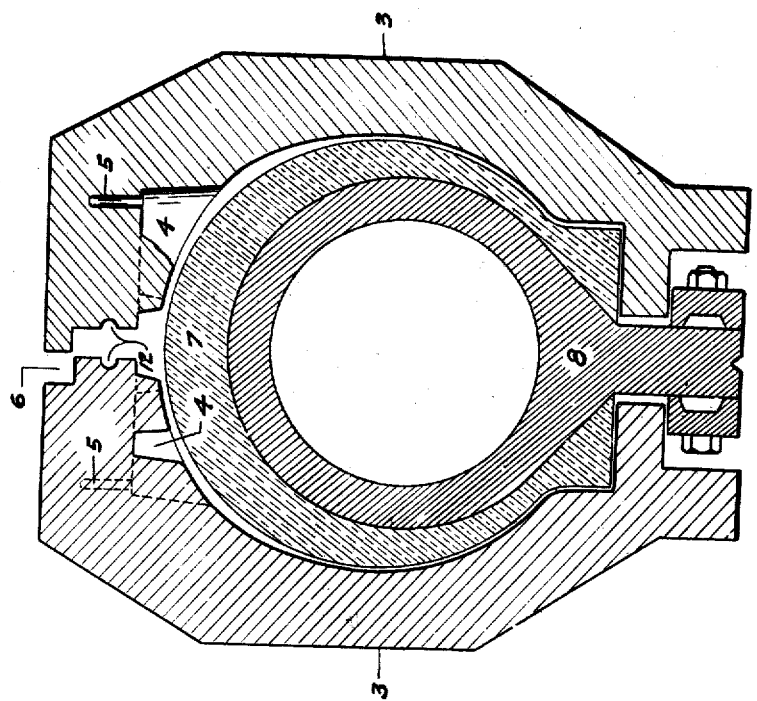
INVENTOR
CHARLES L. WALTON
BY
RHWaters
ATTORNEY

UNITED STATES PATENT OFFICE.

CHARLES L. WALTON, OF AKRON, OHIO, ASSIGNOR TO KELLY-SPRINGFIELD TIRE COMPANY, OF AKRON, OHIO, A CORPORATION OF NEW JERSEY.

TIRE-MOLD.

1,380,085.  Specification of Letters Patent.  Patented May 31, 1921.

Application filed April 16, 1921. Serial No. 461,895.

*To all whom it may concern:*

Be it known that I, CHARLES L. WALTON, a citizen of the United States, residing at Akron, in the county of Summit and State of Ohio, have invented certain new and useful Improvements in Tire-Molds, of which the following is a specification.

This invention relates to specific improvements in the art of molding articles of manufacture, such as tire casings, formed in whole, or in part, of plastic material and has for its principal object the provision of certain air vents, or traps, in a mold, so located with respect to the tread configuration cavities that the material being molded will flow freely into and completely fill the mold without resulting defects due to trapping air, or gases generated during the molding process.

To the attainment of these and other useful objects herein appearing this invention consists in the new and useful combination of features more fully hereinafter described, illustrated in the drawings and specifically claimed.

Figure 1 is a cross sectional view of a mold embodying my invention, particularly illustrating a green, or uncured, tire casing mounted on a core and the whole inserted within a separable mold of annular form preparatory to closing the mold under heat and pressure to effect the molding operation. The mold is arbitrarily broken away to illustrate the tread cavity.

Fig. 2 is a perspective view of a tire fully molded in the type of mold invented, particularly showing the result of the air venting as related to the specific design of mold cavity to which the features claimed apply.

Referring specifically to the drawings:

This invention refers specifically to a mold made in halves 3, having cavities 4 therein adapted to impart a complementary configuration 11, such as shown, to the tread portion of a pneumatic tire casing 7. The high-standing configurations necessitate correspondingly deep mold cavities, and as the transverse contour of the tread surface, as ultimately molded, is substantially flat, and therefore the natural path of flow of the material and escape of gases toward the central annular vent of the mold restricted, it has become necessary to provide auxiliary air vents 5 in the outer limits of the mold cavities.

In the particular operation of molding, for which this mold, with its cavities of specified formation and peculiar secondary air vents is applicable, it is customary to subject the mold shells to hydraulic closing pressures, ranging occasionally above fifteen hundred pounds per square inch; the pressure being exerted concurrently with the application of vulcanizing heat applied for several hours.

As the combined heat and pressure are applied to the article being molded a gradual softening or plasticity is imparted to the material, thus inducing conformity thereof with the interstices of the mold. The cavities for overflow and escape of gases, both central 6 and auxiliary 5, are so proportioned as to nicely accommodate the predetermined surplus of stock that must escape when the mold adjusts itself to the completely closed position. Due to the great internal pressure, the small amounts of gas that are trapped within the several auxiliary air vents 5 do not interfere with, at least, a partial filling up of the vents by the overflowing material. The trapped gas will be compressed within the top of the auxiliary vents. In Fig. 2 will be noted the upstanding overflow fin 10 caused by the flow through the central vent 6 prior to the complete closing of the shells, also the elongated points of overflow 9 which represent that part of the material seeking relief within the air vents 5. These projections are, of course, finally removed from a tire casing. The annular core 8 is shown incased within the tire 7 which preferably is originally formed thereon and removed therefrom only upon the completion of the molding process.

It will be noted that the central overflow 6 is designed to accommodate the bulk of the excess material which, during the closing operation, is extruded within the constantly narrowing circumferential line of cleavage between the shells. Should the overflow be particularly copious annular recesses 12 are provided into which the material may expand, attention being invited to the fact that as soon as the molds start closing the offset registers on either shell, adjacent the numeral 6, seal the overflow cavity in a manner restrictive of any escape of material therebeyond.

In designing the auxiliary air vents 5 the desideratum is that they shall be exactly proportioned to accommodate the excess material which must "back up" into them as the mold closes. The vents being drilled only deep enough to accomplish this end, it will be appreciated that as the gases are compressed therein by the encroaching flow, each vent becomes a miniature air cylinder in which the extruded plug of overflow is the piston, balanced by a pressure equal to that interiorly exerted upon the material being molded by the enormous closing pressure upon the shells. The practical use of this back pressure in each air vent is that complete equalization of the mass of material being molded will result; that is, if there should be an undue mass of material concentrated at one point of the uncured casing and a proportional deficit at another it has been found that as the air vents fill up adjacent the excess during the progress of molding the resilient action of the air cylinder will react to expel a portion of the column or plug as the mass becomes sufficiently plastic to tend to flow toward the unfilled portions. This equalizing flow is slow but positive, as may be appreciated in view of the time element in conjunction with the heat and pressure present.

It will be understood that the mold, of which a section only is illustrated, is of annular form; also that the particular cavity configuration, shown in cross section in the mold, is complementary to the molded tread design configuration 11 and that the design is repeated throughout the internal peripheral surface of the tread portion of the mold.

While a particular form of pneumatic casing is shown, and with it a certain type of core, it will be understood that the disclosure is by way of illustration only, and that my mold can be adapted to the manufacture of any type of tire on any type of core, or on an expanding core or air bag.

Having thus described my invention, what I claim as new therein and desire to secure by Letters Patent is:—

1. A mold comprising separable sections, each section having a design cut therein in intaglio; a register adapted to serve as an overflow for a portion of the excess of an article molded therein; and air traps in said molds at approximately the outer limits of each element of the design.

2. A mold comprising separable counterpart sections, each section having a design cut therein in intaglio; a co-acting register point at the top of the mold adapted to serve as an overflow for a portion of the excess of an article molded therein; and air traps in each mold section at approximately the outer limits of each separate element of the design, said traps being in open communication with the inside of the mold but sealed at their outer ends.

3. A mold comprising separable counterpart sections, each adapted to register with the other to confine the overflow from the excess of an article therein being molded within the cavity therein formed; a design within the mold sections executed in intaglio, said design having a substantially flat transverse face contour; sealed air traps located at approximately the outer limits of each separate element of the design and adapted to receive a portion of the excess flow of material in resilient compression therein.

4. A mold comprising separable counterpart sections; an overflow and register point circumferential of the molds at approximately their median plane of incident; a design in intaglio within the molds, said design being of cruciform pattern in each mold section; and air traps at aproximately the outer limits of each element of each cruciform pattern, said traps being in open communication with the interior of the mold and adapted to receive a part of the excess of the material within the mold.

5. A mold comprising separable counterpart sections of annular form; co-acting register and overflow portions on each section; a design in intaglio within the molds, said design being of cruciform pattern and approximately flat in transverse section; sealed air traps located at approximately the high points at the outer limits of individual elements of the pattern, said traps being proportioned to accommodate, in the aggregate, a part of the excess of the material being molded during the progress of the overflow of the same under pressure and subjected to heat.

6. A mold comprising separable counterpart sections of annular form; co-acting register and overflow portions on each section; a design in intaglio within the molds, said design being of cruciform pattern and approximately flat in transverse section; sealed air traps at the outer corners of each element of the intaglio pattern, said traps having capacities adapted to at least accommodate the excess of material remaining within the mold after the overflow cavity between the mold halves has been filled.

7. In a device of the character described, the combination of a rigid core having thereon an article to be molded consisting of material adapted to become plastic under heat, and mold sections in halves adapted to incase the article and the core, said mold having an overflow cavity along one edge of its registering plane and a cruciform pattern therein in intaglio, and air traps located at the outer ends of the pattern open interiorly to receive the overflow of the material but sealed at their outer ends to form compression chambers adapted to equalize the distributing the plastic material during the progress of molding.

8. In a device of the character described, the combination of an article to be molded formed of material adapted to become plastic under heat, means for interiorly supporting the article, said article having an excess amount of material to more than fill the mold cavities constituting the design to be impressed thereon; and mold sections having a normal overflow of capacity less than the excess of the material and a plurality of sealed air traps located adjacent the outer limits of each element of the intaglio design in the mold, the aggregate capacity of such air traps being regulated to accommodate the excess of the plastic material under elastic pressure.

9. In a mold device, the combination of means for interiorly supporting an article to be molded; an article to be molded comprising an excess of material above that required to fill the design cavities of the mold, said material being adapted to become plastic under heat; and a mold surrounding the article and its support, said mold having an annular overflow aperture adapted to accommodate less than the excess of the material when the mold is closed and secondary sealed overflow cavities located within the intaglio design, said secondary overflow cavities being adapted to resiliently receive a part of the excess of the material during the process of closing the mold under pressure whereby the plastic material will be equalized throughout the mold.

In testimony whereof I affix my signature.

CHARLES L. WALTON.